INVENTOR
WILLIAM C. KALLAS

BY Robert L. Slater, Jr.
ATTORNEY

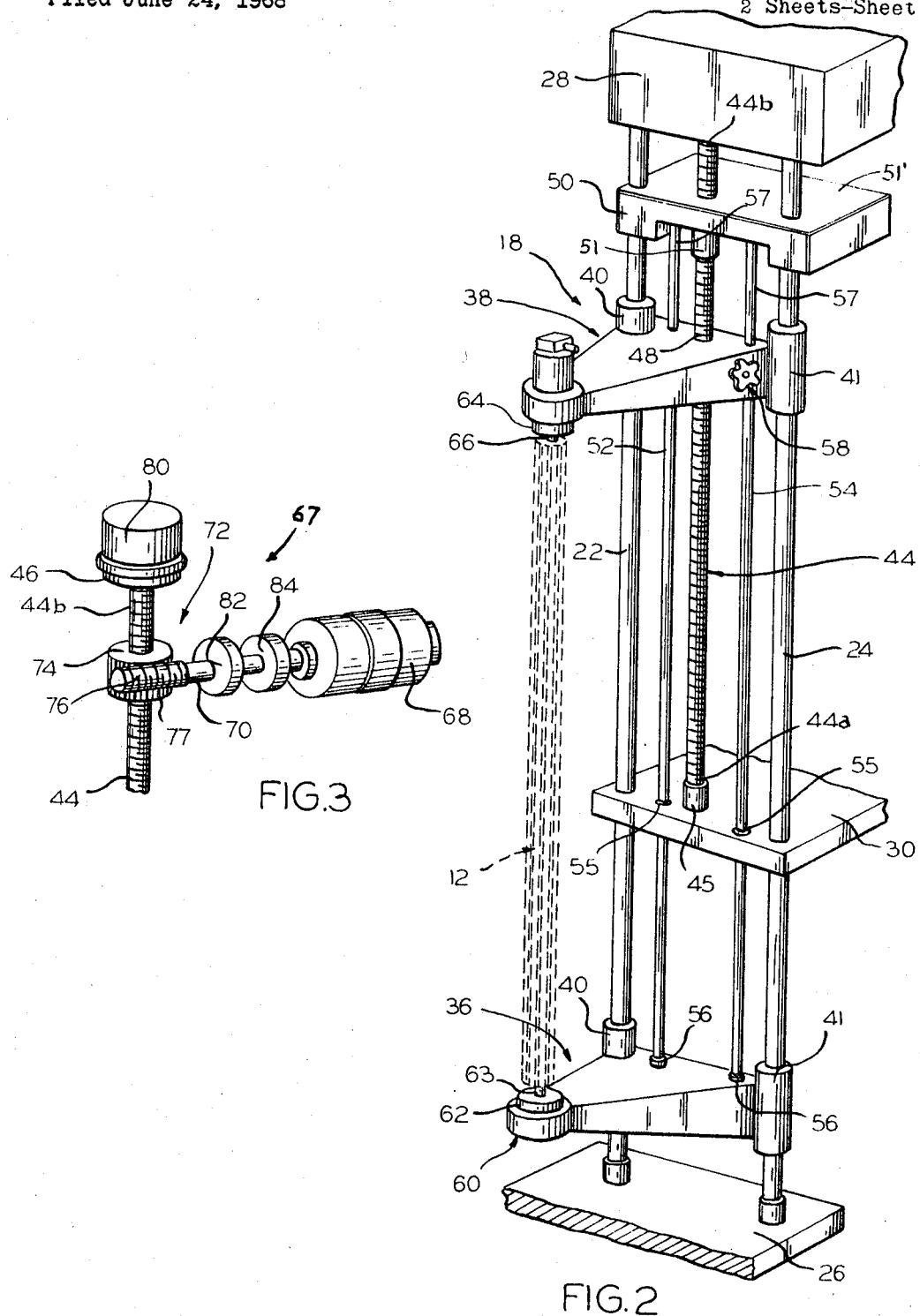

United States Patent Office 3,515,836
Patented June 2, 1970

3,515,836
ELEVATOR MEANS FOR A HEAT SCANNER DEVICE
William C. Kallas, Park Ridge, Ill., assignor to Business Assets Corporation, Chicago, Ill., a corporation of Illinois
Filed June 24, 1968, Ser. No. 739,567
Int. Cl. H05b 5/02, 5/16
U.S. Cl. 219—10.43
9 Claims

ABSTRACT OF THE DISCLOSURE

A heat scanner device having an elevator means comprising a screw member secured in a fixed position. By rotating the screw member the workpiece or a part thereof is positioned in a heating means or moved through the heating means at a controlled rate of speed.

BACKGROUND OF THE INVENTION

The present invention relates generally to a heat scanner device for heating a metal workpiece, such as a cam, spline, etc., prior to quenching the piece in a liquid to derive a desired hardness. More particularly, the invention relates to an elevator means for a heat scanner device capable of accurately positioning a workpiece or parts thereof in a heating means and moving the workpiece through the heating means at a controlled rate of speed.

The elevator means generally used in the past in the heat scanner devices of the type described herein, comprised a chain and sprocket arrangement. By rotating the sprocket with the chain the workpiece was either raised or lowered into the heater. With such prior elevator means it was a very time consuming task to properly position specific parts or sections of the workpiece in the heater. Furthermore, it was extremely difficult to move the workpiece at a constant rate of speed through the heater and virtually impossible to move the piece at constant slow speeds. Therefore, the workpiece was usually not evenly and uniformly heated.

In order to move the workpiece in the heater at a constant speed, it was usually required heretofore to use an elevator means having a hydraulic lifter such as a movable cylinder. Although performing adequately, these hydraulic elevators required frequent maintenance and repair. The subject invention, on the other hand, provides an elevator means which may be precisely controlled and requires minimal maintenance in comparison with the hydraulic elevator.

SUMMERY OF THE INVENTION

The subject invention provides an elevator means for a heat scanner device having a screw member secured in a fixed position. A movable support means for supporting a workpiece is associated with the screw member and moves in response to the rotational movement of the screw member.

A nut is threadedly associated with the screw member and rigidly connected to the support means. When the screw is rotated, the nut moves along the length of the screw member, causing the support means to move in the same direction as the nut.

A braking means is associated with the screw member to provide an opposing force and prevent uncontrollable rotational movement of the screw member when the workpiece is being lowered into a heating means.

Accordingly, a primary object of the invention is to provide a heat scanner device for evenly and uniformly heating predetermined parts of a workpiece prior to quenching the same in a liquid for deriving a desired even and uniform hardness.

Another primary object of the invention is to provide an elevator means for a heat scanner device having the capability to precisely position predetermined parts of a workpiece in a heating means.

Another primary object is to provide an elevator means for a heat scanner device having the capability for moving a workpiece through the heating means at a controlled rate of speed.

Another object is to provide an elevator means comprising a screw member secured in a fixed position whereby the rotation of the screw member causes the work to be moved within a heating means.

Another object is to provide a nut threadedly associated with a screw member and rigidly associated with a workpiece whereby the rotational movement of the workpiece causes the nut to move along the screw member and the workpiece to move in the same direction as the nut.

Still another object is to provide a braking means to apply an opposing force when the workpiece is moving in a downward direction and thereby prevent uncontrollable rotation of the screw member.

These and other objects and advantages of the invention will become apparent from the illustrations in the accompanying drawings and the following specification and claims.

BRIEF DESCRIPTION OF THE DRAWINGS

Referring to the drawings in which the same characters of reference are employed to indicate corresponding or similar parts throughout the several figures of the drawings.

FIG. 2 is an enlarged fragmentary perspective view of the elevator means of the heat scanner device in FIG. 1; and FIG. 3 is a fragmentary perspective view of the power means for driving the screw member of the elevator means.

DESCRIPTION OF THE PREFERRED EMBODIMENT

Figure 1:
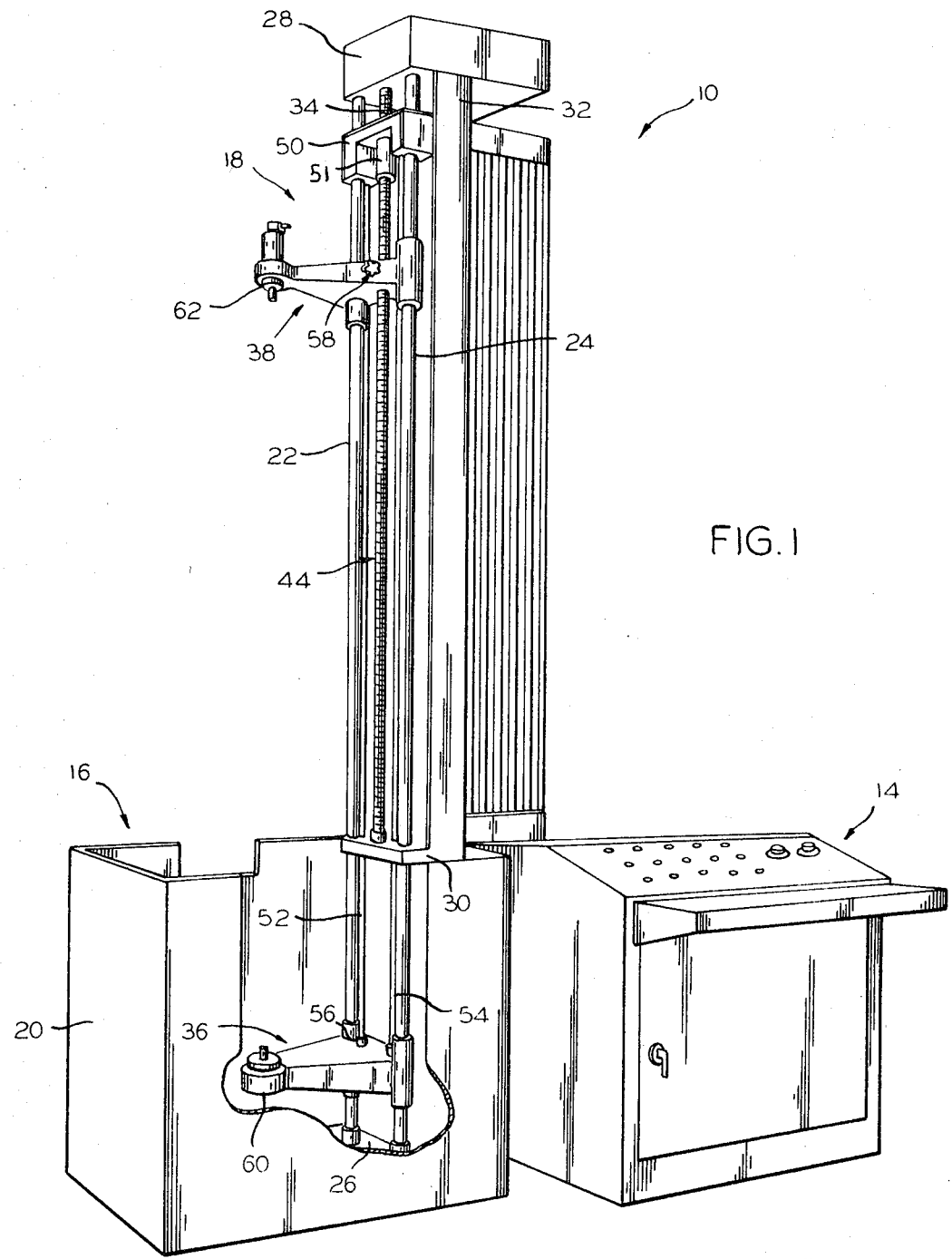
FIG. 1 is a perspective view of a heat scanner device embodying the principles of the invention.

Referring now to FIG. 1 of the drawings, the reference numeraly 10 indicates generally an electro-mechanical heat scanner device for evenly and uniformly heating a workpiece 12 such as the spline illustrated in phantom in FIG. 2. After being heated, the workpiece 12 is quenched in a suitable liquid and subsequently cools to an even hardness. The heat scanner device 10 comprises a computer control section 14, an electrical heating oven section 16 and an elevator means 18.

The heating section 16 includes a housing 20 containing an induction coil (not shown) which produces a magnetic field. An intense and penetrating heat is developed in the portion of the workpiece positioned in or passing through the magnetic field. The workpiece is rotated within the magnetic field to insure uniform and even heating in the event there are dead areas in the induction coil or variations in the magnetic field. Although various arrangements may be used, induction coil heating is particularly suitable for precision heating.

The elevator means 18 raises and lowers the workpiece 12 inside the heating section 16. When the workpiece reaches a preset vertical level, it is rotated and heated. The piece may then be moved automatically to a second vertical level where another portion is heated. The process may be repeated for any number of vertical levels defined within the height of the housing 20. The elevator means may also continually move the rotating piece vertically through the heating section at a controlled rate of speed during the heating process.

The process for heating the workpiece 12 is automatically controlled by the computer control means 14. The computer means, among other functions, determines the speed of movement of the elevator means 18 through the heating means 16 and the time duration for heating the workpiece at the predetermined levels.

Elevator means

With particular reference to FIG. 2, the elevator means 18 will now be described with greater detail. The elevator means 18 comprises an elongated frame structure having a pair of outer rod members 22, 24 rigidly connected at their bottom ends to a base plate 26 and at their upper ends to a mounting box 28. Base plate 26 is secured in the housing 20 of heating section 16 (FIG. 1).

An intermediate plate 30 is vertically positioned between the base plate 26 and box 28. A pair of spaced apart and opposed sidewalls 32, 34 (FIG. 1) rigidly connect the intermediate plate 30 and box 28.

A lower support member 36 is positioned between the base plate 26 and the intermediate plate 30. An upper support member 38 is positioned between the intermediate plate 30 and box 28. Each support member 36, 38 includes a pair of slide portions 40, 41. As shown, the outer rods 22, 24 extend respectively through slide portions 40, 41 of the corresponding support members 36, 38. The rods 22, 24 are in frictional contact with the slide portions 40, 41 and therefore, provide structural support for the support members 36, 38.

A screw drive member 44 is rotatably connected in a fixed position between rods 22, 24. The lower end 44a of the screw member 44 is secured in an antifriction bearing 45 fixedly mounted on the intermediate plate 30 (FIG. 2) and the upper end 44b is secured in an antifriction bearing 46 (FIG. 3) mounted (not shown) in box 28. Screw member 44 extends freely through an opening 48 formed in the upper support 38.

A nut member, indicated generally by reference numeral 50, is slidably supported on the outer rods 22, 24 and threadedly associated with screw member 44. Nut member 50 comprises an internally threaded hollow cylinder 51 which extends downward from plate 51. As shown, nut member 50 is positioned between box 28 and upper support member 38. The nut member 50 moves up or down in response to the forward or reverse rotation of the screw member 44.

A pair of inner bars 52, 53 are positioned spaced apart between the outer rods 22, 24 at opposite sides of screw member 44. Bars 52, 54 are rigidly secured at their bottom ends 56 to the lower support 36 and at their top ends 57 to nut member 50. The inner bars 52, 54 freely extend through openings 55 (FIG. 2) formed in the intermediate plate 30.

Locking means indicated generally by reference numeral 58 (FIG. 2) secures the upper support 38 to bars 52, 54 at the desired vertical level. When locking means 58 is in an unlocked position, the upper support 38 may be manually raised up or down.

After the upper support member 38 is secured to bars 52, 54 by tightening locking means 58, any up or down movement of nut member 50 moves both the upper and lower support members 36, 38 an equal distance. Thus, when screw member 44 is rotated, nut 50 moves up or down in response thereto and causes both the upper and lower support members 36, 38 to move correspondingly as a single unit. Therefore, although the vertical positions for nut 50 and support members 36, 38 vary, the distance between the upper and lower supports 36, 38 and the distance between the upper support 38 and nut 50 remain fixed.

A rotator 60 is mounted at the outer end of the lower support 36. An antifriction spring-loaded bearing 62 is secured on the rotator 60. A finger 63 protrudes upward from the lower bearing 62. The rotator may be driven by a hydraulic drive means (not shown) or other suitable drive means.

An antifriction upper spring-loaded bearing 64 is mounted at the outer end of the uupper support 38. A finger 66 protrudes downward from upper bearing 64. The upper bearing 64 is positioned in an opposed vertical spaced relationship with the lower bearing 62.

The workpiece 12 is fixedly secured between the upper and lower supports 36, 38. Initially the upper and lower spring-loaded bearings 64, 60 are depressed inward and the piece 12 inserted therebetween with fingers 66 and 63 serving as positioning guides. Thereafter, the spring bearings 64, 60 flex outward to resiliently lock the piece in place. As the rotator 60 revolves, the workpiece now locked between bearings 62 and 64, also rotates. By continually rotating the piece it is evenly and uniformly heating in heating section 16.

Turning now particularly to FIG. 3, a drive means indicated generally by the reference numeral 67 controls the rotational movement of screw member 44. The drive means 67 comprises a motor 68 coupled by a shaft 70 to a speed reducer indicated generally by reference numeral 72. The motor may be a conventional DC motor.

The speed reducer 72 comprises a worm gear 74 secured in a vertical position on the screw member 44. A worm 76 formed at the outer end of shaft 70 is coupled to the gear teeth 77 of worm gear 74. The motor rotation is transmitted to the screw member 44 by the worm 76 and worm gear 74, causing the screw member to rotate.

When the motor rotation is reversed, rotation of screw member 44 is also reversed. Therefore, for one direction of screw rotation the nut 50 and support members 36, 38 are raised and for the reverse rotation the nut and support members are lowered.

An electric brake 80 is coupled to the upper end 44b of screw member 44. Brake 80 positively stops screw member 44 when elevator means 18 is at rest.

A counterweight brake 82 is coupled in shaft 70. Counterweight brake 82 primarily functions to provide an opposing force to the force presented by workpiece 12 when it is moving in a downward direction. Thus, counterweight brake 82 is a safeguard against the downward pull of the load causing or triggering uncontrollable rotation of screw member 44. It may be necessary to change the force of the counterweight brake 82 in order to provide an effective counter-force if there are wide variations in the loads being heated by the scanner device 10.

The counterweight brake 82 may comprise magnetic particles which generate a frictional force when the particles shear against each other. Therefore, when the elevator means 18 is in a downward movement or at rest, a frictional force is generated in opposition to the downward pull of the load.

Although in the illustrated embodiment, brake 80 is positioned at the top of screw member 44 and the counterweight brake 82 is coupled to shaft 70, these positions may be interchanged. Brakes 80, 82 may also be placed at different points and still provide substantially the same braking function.

A speed control means indicated generally by reference numeral 84 is mechanically associated with the shaft 70 and electrically associated with the motor 68. The speed control means 84 may be a tachometer generator to convert the rotational speed of shaft 70 to electrical signals for increasing and decreasing motor speed when the motor speed varies from a predetermined desired set speed. The computer control 16 may automatically vary the set speed or disable the speed control means 84 when an increase or decrease in the rotational speed of the screw member 44 is necessary.

In operation, the elevator means 18 precisely positions the workpiece or a specific section thereof in the heater section 16. The piece is rotated to provide a uniform and even heating. The computer control 14 may be programed to rapidly move the piece in position inside the heating section 16 and then to move the piece at a slow rate of speed during the heating process. The computer control 14 may also be programed to rapidly move the piece from one vertical position to another when particular sections of the workpiece to be heated are spaced apart. After the piece is heated, it is quenched in a suitable liquid. The entire piece or sections thereof which were heated, cool to an even and uniform hardness.

The description of the preferred embodiment of this invention is intended merely as illustrative of this invention, the scope and limits of which are set forth in the following claims.

I claim:

1. In a heat scanner device including a frame, a heating section for heating a workpiece and an elevator means for moving at least a portion of the workpiece through the heating section, said elevator means comprising:
   a screw member secured to the frame in a fixed position, said screw member being rotatable in said position;
   support means to support the workpiece;
   a nut member threadedly associated with the screw member and fixedly attached to the support means when the support means operatively supports the workpiece;
   at least one rod member slidably associated with the support means and the nut member; and
   power means for rotating said screw member to cause the nut member to move along the length of the screw member and support means and nut member to move simultaneously along the length of the rod member, said movement of the support means enabling the workpiece to be moved within the heating section.

2. In a heat scanner device including a frame, a heating section for heating a workpiece and an elevator means for moving at least a portion of the workpiece through the heating section, said elevator means comprising:
   a screw member secured to the frame in a fixed position, said screw member being rotatable in said position;
   an upper support member and a lower support member, said workpiece being secured between said support members;
   a nut member threadedly associated with the screw member, the rotation of the screw member causing the nut member to move along the length of the screw member whereby the support means moves in response to the movement of the nut member;
   at least one bar member rigidly associated with the nut member and said lower support member, said upper support member being movably associated with the bar member;
   locking means having a lock position and an unlock position, said upper support member being movable along the bar member when the locking means is in the unlock position and secured to the bar member when the locking means is in the lock position; and
   power means for rotating said screw member to cause said workpiece to move within the heating section.

3. The heat scanner device of claim 2 wherein said frame comprises:
   an upper plate and a lower plate; and
   at least one rod member is secured at one end to the upper plate and at the opposite end to the lower plate, said lower support member and upper support member and said nut being slidable along said rod.

4. The heat scanner device of claim 3 wherein an intermediate plate is disposed between the upper and lower plate, said screw member being fixedly secured to the upper plate and the intermediate plate, said lower plate being positioned in the heating means, said lower support being movable between the lower plate and intermediate plate.

5. The heat scanner device of claim 2 wherein said power means comprises:
   a motor rotating a shaft;
   a worm formed at the outer end of said shaft;
   a worm gear secured to the screw member and coupled to the worm, the rotation of the shaft causing rotation of the worm gear and screw member; and
   a counterweight brake means associated with said worm for generating a force in opposition to the downward pull of the workpiece and thereby controlling the downward movement of the workpiece.

6. In a heat scanner device including a frame, a heating means for heating a workpiece and an elevator means for moving at least a portion of the workpiece through the heating means, said elevator means comprising:
   a screw member secured to the frame in a fixed position, said screw member being rotatable in said position;
   support means associated with the screw member and supporting the workpiece;
   power means for rotating said screw member to cause said workpiece to move within the heating means;
   said frame including an upper plate and a base plate;
   a pair of spaced apart rod members secured to the upper plate and base plate;
   a nut member threadedly associated with the screw member and slidably associated with said rod members;
   support means comprising an upper support member and a lower support member, said support members being slidably associated with the rod members, said upper support member being positioned above the lower support member and said nut member being positioned above the upper support member;
   a pair of spaced apart bar members positioned on opposite sides of said screw member, each of said bar members being rigidly associated at one end with said nut member and at the other end with said lower support member; and
   locking means having a locked position and an unlock position, said support member being movable along said rods and said bars when the locking means is in the unlock position, said upper support member being locked to said bars when in the lock position, the rotation of said screw member causing the nut member to move along the length of the screw member whereby the lower support and upper support when locked to said bar move in response to the movement of the nut member.

7. An elevator means for moving a workpiece from one position to another position comprising:
   a frame;
   a screw member secured to the frame in a fixed position, said screw member being rotatable in said position;
   an upper support member;
   a lower support member, said workpiece being secured between the support members;
   a nut member is threadedly associated with the screw;
   at least one bar member is rigidly associated with the nut member and said lower support member;
   locking means having a lock position and an unlock position, said upper support member being movable along the bar member when the locking means is in the unlock position, and secured to the bar member when the locking means is in the lock position;
   at least one rod member, said upper and lower support members and said nut being slidably associated with said rod member; and
   power means for rotating said screw member to cause said nut to move along said screw member and said support members to move an equal distance in the same direction as the movement of the nut member.

8. In a heat scanner device including a frame, a heating means for heating a workpiece and an elevator means for moving at least a portion of the work piece through the heating means, said elevator means comprising:
- a screw member secured to the frame in a fixed position, said screw member being rotatable in said position;
- support means comprising an upper support member and a lower support member, said workpiece being supported between said support members;
- a nut member threadedly associated with the screw member;
- at least one bar member for fixedly associating the nut member with the supporting members; and
- locking means having a lock position and an unlock position, said locking means being associated with at least one of said support members whereby said one support member is movable along the bar member when the locking means is in the unlock position and secured to the bar member when the locking means is in the lock position, said nut member being fixidly associated with the support member when the support members operatively support the workpiece.

9. The heat scanner device of claim 8 further includes:
at least one of said support members comprising a spring loaded bearing means having a depressed position and an extended position, said bearing means when in the depressed position enabling the workpiece to be inserted between the support members, said bearing means resiliently locking the workpiece between the support members when in the extended position; and
a rotator associated with said bearing means for rotating the workpiece in a fixed position between the support members.

References Cited

UNITED STATES PATENTS

| | | | |
|---|---|---|---|
| 2,391,086 | 12/1945 | Crandell | 219—10.61 |
| 2,905,798 | 9/1959 | Frentel | 219—10.43 |
| 3,030,194 | 4/1962 | Emeis | 219—10.43 |
| 3,036,186 | 5/1962 | Fliezar | 219—10.43 X |
| 3,136,876 | 6/1964 | Crosthwait | 219—10.77 |
| 3,252,693 | 5/1966 | Nelson | 219—10.61 X |
| 3,254,228 | 5/1966 | Jablonski et al. | 219—10.43 X |
| 3,271,551 | 9/1966 | Keller | 219—10.77 X |
| 3,338,759 | 8/1967 | Ledl et al. | 219—10.43 X |
| 3,144,308 | 8/1964 | Tarter | 23—273 |

JOSEPH V. TRUHE, Primary Examiner

L. H. BENDER, Assistant Examiner

U.S. Cl. X.R.

23—373; 219—10.67

PO-1050
(5/69)

UNITED STATES PATENT OFFICE
CERTIFICATE OF CORRECTION

Patent No. 3,515,836        Dated June 2, 1970

Inventor(s) William C. Kallas

It is certified that error appears in the above-identified patent and that said Letters Patent are hereby corrected as shown below:

Column 6, line 20, after "workpiece;" insert --and--; same column 6, line 41, after "said" insert --upper--.
Column 7, line 12, for "supporting" read --support--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents